UNITED STATES PATENT OFFICE.

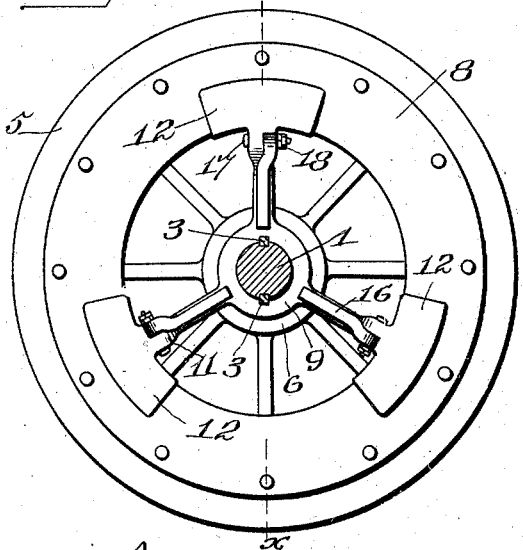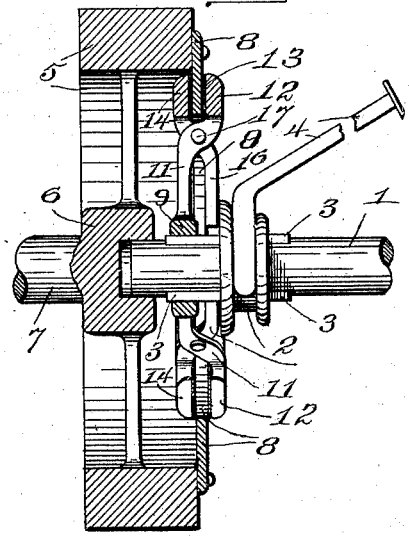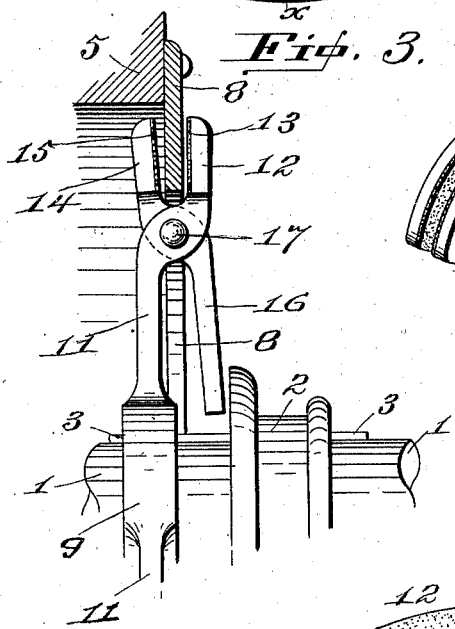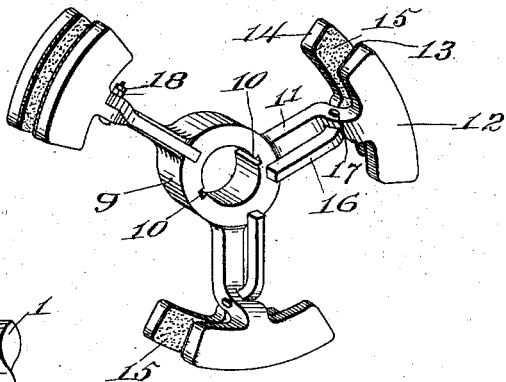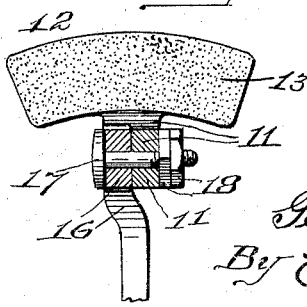

GEORGES FRANC, OF WASHINGTON, DISTRICT OF COLUMBIA.

FRICTION-CLUTCH.

967,150.   Specification of Letters Patent.   Patented Aug. 9, 1910.

Application filed December 2, 1909. Serial No. 531,017.

*To all whom it may concern:*

Be it known that I, GEORGES FRANC, a citizen of the United States, residing at Washington, in the District of Columbia, have invented certain new and useful Improvements in Friction-Clutches, of which the following is a specification.

This invention relates to friction clutches, and pertains especially to the class of longitudinally movable opposing jaw clutches for transmitting motion of a driven shaft to another shaft for driving it. And the invention is primarily intended for use in coupling and uncoupling the driving and driven shafts of an automobile, but it is readily adapted for various other purposes.

The object of the invention is to provide a speed regulating friction clutch of novel and peculiar construction and arrangement of parts, and applicable to shafts and similar rotating members, whereby the speed of the driven member may be varied at pleasure to any speed of the driving member, and may be maintained at any such speed.

A further object of the invention is to provide in a friction clutch such novel and peculiar construction and arrangement of parts as will afford simple and positive means for imparting rotary movement of a shaft, which revolves the clutch, to a shaft having a pulley or fly wheel attached thereto and provided with an annular flange projecting from the periphery of the wheel toward its axis and adapted to be grasped by the clutch jaws radially from the clutch shaft.

With these and various other objects in view, the invention consists in a plurality of arms revolved by and radiating from a shaft and provided with friction jaws for engaging one side of an annular flange of a wheel or pulley, and a stem fulcrumed on and hung from each of said arms so that the stems may be operated from the shaft to make the jaw of the pivoted arms engage the other side of the said flange, whereby the flange is clamped between the jaws so as to impart the motion of such shaft to another shaft upon which the pulley or wheel is mounted.

In the accompanying drawings forming part of this application: Figure 1 is a side elevation of a wheel showing the application of the invention. Fig. 2 is a sectional view on the line $x$—$x$, Fig. 1. Fig. 3 is an enlarged sectional elevation showing the clutch in open position. Fig. 4 is a detail perspective view of the clutch. Fig. 5 is a detail sectional view taken through one of the pivots of the clutch.

The same reference numerals denote the same parts throughout the several views of the drawings.

While the invention is applicable to horizontal parallel shafts of various machinery, it is especially applicable to automobile shafts, and as shown in the drawings, the power or driven shaft 1 has the usual sleeve or collar 2 revolved therewith, and slidable longitudinally thereon by means of the keys 3, and such sleeve is operated by a lever 4. An ordinary fly-wheel or pulley 5 having a hub 6 from which extends a driving shaft 7 is operated from and by the shaft 1. An annular flange or plate ring 8 extends from the periphery of the wheel 5 toward the axis of the wheel. This ring may be riveted to one face of the wheel or it may be made a part of the wheel in the manufacture thereof.

The invention consists of the clutch mechanism or device mounted on and revolved by the shaft 1 for coupling and uncoupling the shaft with the wheel 5, so as to impart the motion of the shaft 1 to the shaft 7, and said clutch device comprises a spider consisting of a hub 9 having key-ways 10 loosely fitting the keys 3, and a plurality of arms 11 radiating from the hub 9, each arm extending from the hub 9 through the ring 8 to the outer face of the ring and terminating in a jaw 12, having a frictional face 13 to engage the outer face of the ring; a like jaw 14 opposed to each of the spider jaws and having a frictional face 15 for engaging the inner face of the ring, each of the jaws 14 having a stem 16 projecting therefrom and extending from the inner side of the ring across the arms 11 to the outer side of the ring; such crossing point being made within the ring opening, a stem being fulcrumed to each arm at said crossing point by a bolt 17 and lock nuts 18. The stems hang pendent from the bolts between the ring and the sleeve or collar 2, and are operated by the sliding movement of the said collar or sleeve for operating both sets of jaws with respect to the ring.

During the longitudinal movement of the stems the spider hub has a slight longitudinal movement on the keys 3, by reason of the fulcrum movement of the stems, so that the opposing jaws make a direct positive grasp of the flange without any lost motion in clutching and releasing the ring, or in the transmission of the motion of one of the shafts to the other shaft.

Having thus described my invention what I claim as new and desire to secure by Letters Patent is:

1. The combination, with a driven shaft, a sleeve or collar slidable longitudinally on the shaft, a driving shaft, a fly wheel secured to the driving shaft, means for sliding the collar or sleeve, and a plate ring projecting from the periphery of the wheel toward its axis, of a spider clutch comprising a plurality of arms radiating from the spider hub which is mounted on and revolved by the driven shaft, and friction jaws on each of said arms for engaging the outer face of the ring, a stem fulcrumed on each arm and depending therefrom outside of the ring for engagement by the collar or sleeve, and a friction jaw on each stem for engaging the inner face of the ring.

2. In a friction clutch, the combination, with a pair of shafts, a collar slidable on one of the shafts, means for sliding the collar, a fly wheel secured to the other shaft, and a plate ring secured to the wheel, of a spider having arms radiating from its hub which is mounted on the collar shaft back of the ring, a friction jaw on each of said arms for engaging the front face of the ring, and a stem fulcrumed on each of said arms and depending therefrom in front of the ring, and a friction jaw on each stem for engaging the back face of the ring.

3. The combination, with a driven shaft, a collar slidable longitudinally on the shaft, means for sliding the collar, and a fly wheel or pulley loosely mounted on the shaft, of means for coupling the shaft and pulley together comprising a plate ring or annular flange projecting from the wheel toward its axis, a spider having arms radiating from its hub which is slidably mounted on the shaft and revolved thereby, said arms extending through the ring and terminating in friction jaws upon the outer face of the ring, and a stem fulcrumed on each arm and having a friction jaw for engaging the inner face of the ring, said stems projecting through the ring and hanging pendent outside of the ring.

In witness whereof I hereunto set my hand in the presence of two witnesses.

GEORGES FRANC.

Witnesses:
C. T. BELT,
WM. E. VALK, Jr.